United States Patent
Gila et al.

(10) Patent No.: US 10,403,215 B2
(45) Date of Patent: Sep. 3, 2019

(54) PASSIVE E-PAPER IMAGING

(71) Applicant: Hewlett-Packard Development Company, L.P., Houston, TX (US)

(72) Inventors: Omer Gila, Palo Alto, CA (US); Napoleon J Leoni, Palo Alto, CA (US); Henryk Birecki, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/763,939

(22) PCT Filed: Oct. 28, 2015

(86) PCT No.: PCT/US2015/057774
§ 371 (c)(1),
(2) Date: Mar. 28, 2018

(87) PCT Pub. No.: WO2017/074340
PCT Pub. Date: May 4, 2017

(65) Prior Publication Data
US 2018/0284528 A1     Oct. 4, 2018

(51) Int. Cl.
*G09G 3/34* (2006.01)
*G06F 3/00* (2006.01)
(Continued)

(52) U.S. Cl.
CPC ............ *G09G 3/344* (2013.01); *B41J 3/4076* (2013.01); *G02F 1/167* (2013.01); *G09F 3/00* (2013.01); *G09F 9/372* (2013.01); *G02F 1/1681* (2019.01)

(58) Field of Classification Search
CPC .. G02F 1/133348; G02F 1/1681; G02F 1/167; G02F 1/1334; G02F 1/1337;
(Continued)

(56) References Cited

U.S. PATENT DOCUMENTS 5,389,945 A * 2/1995 Sheridon ............. G02B 26/026
345/107
5,847,786 A * 12/1998 Shimada ............... G02F 1/1334
349/86

(Continued)

FOREIGN PATENT DOCUMENTS

JP       2000089696       3/2000
JP       2000305489       11/2000
(Continued)

OTHER PUBLICATIONS

Richard C., L; Physics and Performance Optimization of Electronic Paper; Oct. 2002 ; http://www.ingentaconnect.com/content/ist/jist/2002/00000046/00000006/art00012.
(Continued)

*Primary Examiner* — Darlene M Ritchie
(74) *Attorney, Agent, or Firm* — Dicke Billig & Czaja PLLC

(57) ABSTRACT

An imaging device for a passive e-paper display includes an erasing head to emit ions in a first polarity followed by an opposite second polarity after a first time period. The passive e-paper display is mountable on a support in a spaced apart relationship relative to the erasing head and by which the emitted ions are receivable onto substantially the entire surface of the passive e-paper display. Relative movement occurs between the support and the erasing head at least some of the time during the emission of ions from the erasing head.

11 Claims, 9 Drawing Sheets

(51) Int. Cl.
*B41J 3/407* (2006.01)
*G09F 9/37* (2006.01)
*G02F 1/167* (2019.01)
*G02F 1/1681* (2019.01)
*G09F 3/00* (2006.01)

(58) Field of Classification Search
CPC . G09G 3/344; G09F 9/372; G09F 3/00; B41J 3/4076
See application file for complete search history.

(56) References Cited

U.S. PATENT DOCUMENTS

| | | | |
|---|---|---|---|
| 5,866,284 | A | 2/1999 | Vincent |
| 6,333,754 | B1 | 12/2001 | Oba |
| 6,515,790 | B2 | 2/2003 | Miyamoto |
| 6,982,734 | B2 | 1/2006 | Pan |
| 7,140,550 | B2 | 11/2006 | Ramachandran |
| 7,580,845 | B2 | 8/2009 | Burman |
| 8,144,388 | B2 | 3/2012 | Ogawa |
| 8,514,256 | B2 | 8/2013 | Ogawa et al. |
| 9,104,083 | B2 | 8/2015 | Tamoto et al. |
| 2002/0141801 | A1* | 10/2002 | Shimoda ............... B41J 3/4076 400/76 |
| 2003/0067427 | A1 | 4/2003 | Comiskey |
| 2005/0134550 | A1 | 6/2005 | Schmitz |
| 2006/0017659 | A1 | 1/2006 | Ogawa et al. |
| 2007/0045399 | A1 | 3/2007 | Martin |
| 2011/0298760 | A1 | 12/2011 | Gila |
| 2012/0206341 | A1 | 8/2012 | Gila |
| 2012/0320001 | A1 | 12/2012 | Gila |
| 2013/0003162 | A1 | 1/2013 | Leoni et al. |
| 2013/0235446 | A1 | 9/2013 | Leoni |
| 2014/0078035 | A1* | 3/2014 | Sato ..................... G09G 3/344 345/107 |
| 2014/0210805 | A1 | 7/2014 | Birecki et al. |
| 2014/0239068 | A1 | 8/2014 | Park |
| 2014/0240299 | A1* | 8/2014 | Gila ................... G06F 3/03545 345/179 |
| 2014/0253426 | A1 | 9/2014 | Leoni |
| 2015/0177588 | A1* | 6/2015 | Tamoto ................. G02F 1/167 359/296 |
| 2015/0246553 | A1 | 9/2015 | Tamoto et al. |

FOREIGN PATENT DOCUMENTS

| | | |
|---|---|---|
| JP | 2008114460 | 5/2008 |
| JP | 2008149498 | 7/2008 |
| JP | 2009288290 | 12/2009 |
| JP | 2011154302 A | 8/2011 |
| WO | WO-2010114534 | 10/2010 |
| WO | WO-2015-116216 | 8/2015 |
| WO | WO-2015116211 | 8/2015 |

OTHER PUBLICATIONS

Lean, Richard C. "Physics and performance optimization of electronic paper." Journal of Imaging Science and Technology 46, No. 6 (2002): 562-574.

* cited by examiner

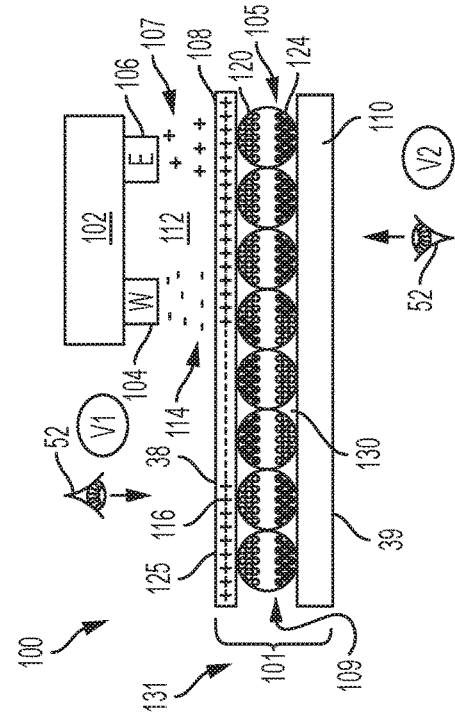
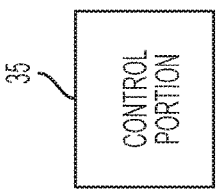
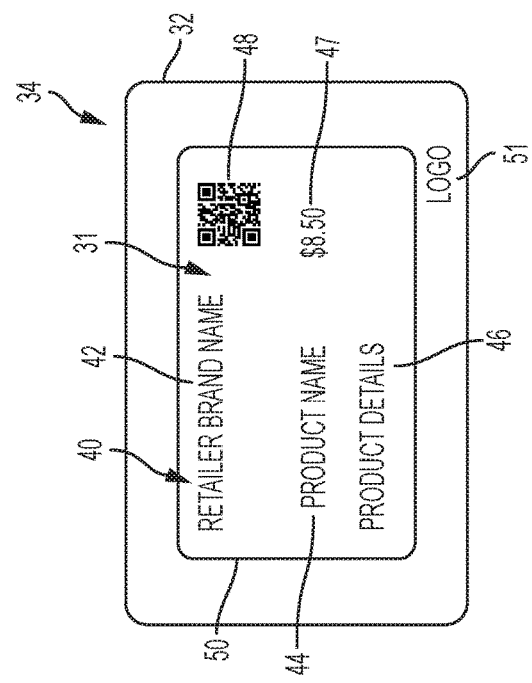
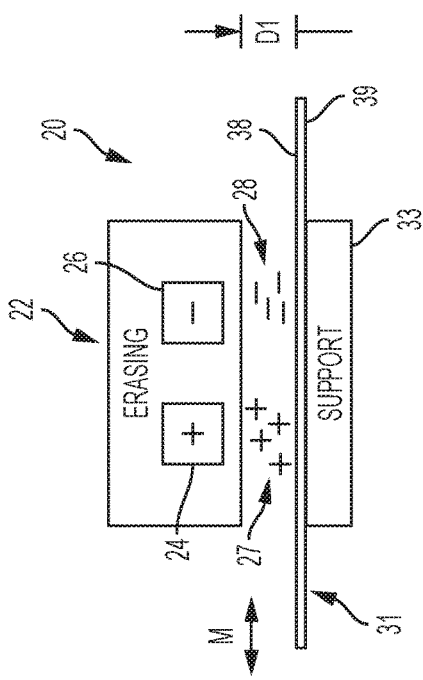

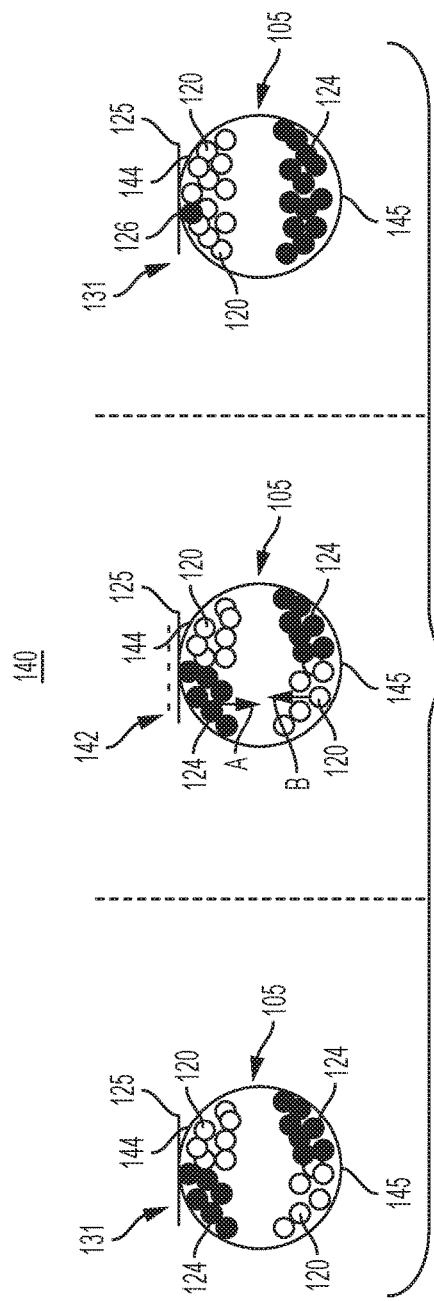
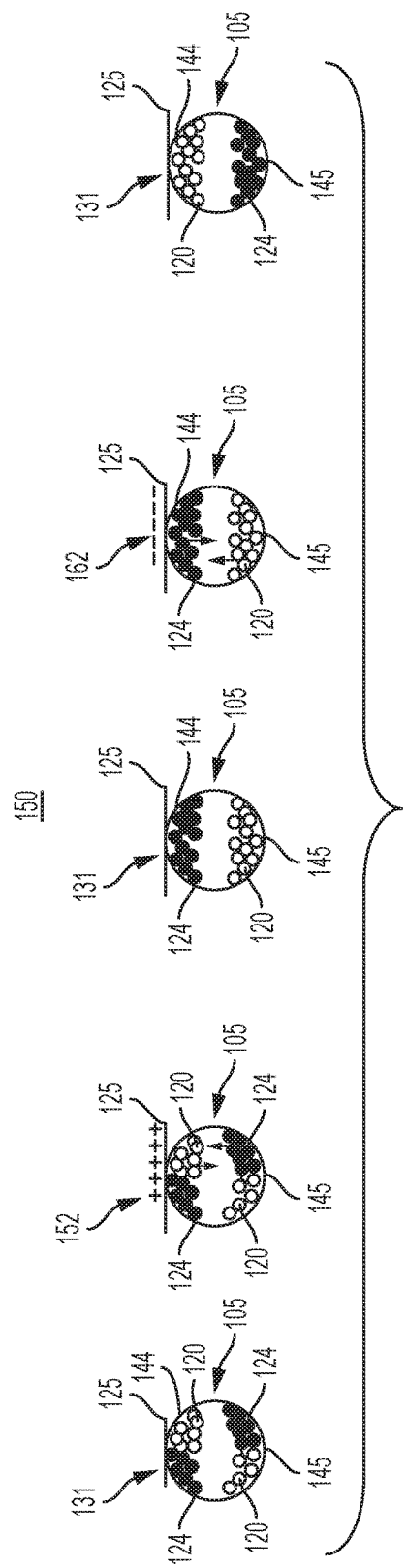
FIG. 3A
FIG. 3B

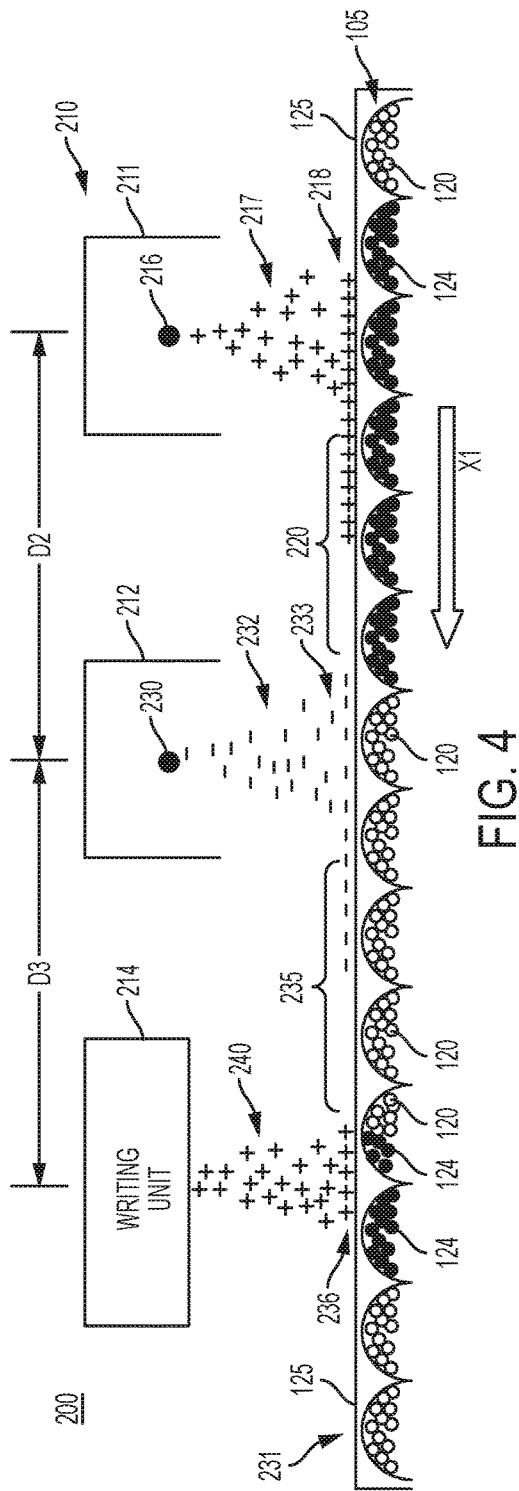
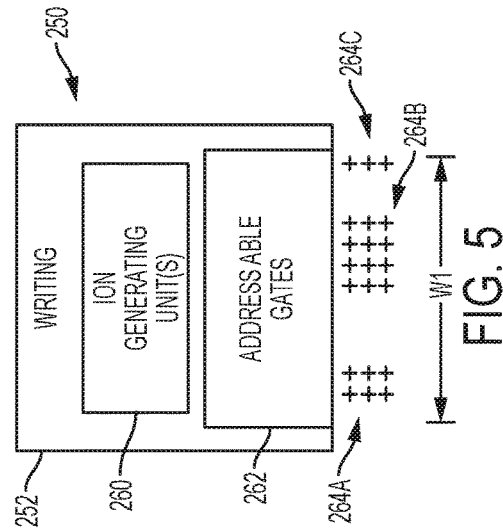
FIG. 4
FIG. 5

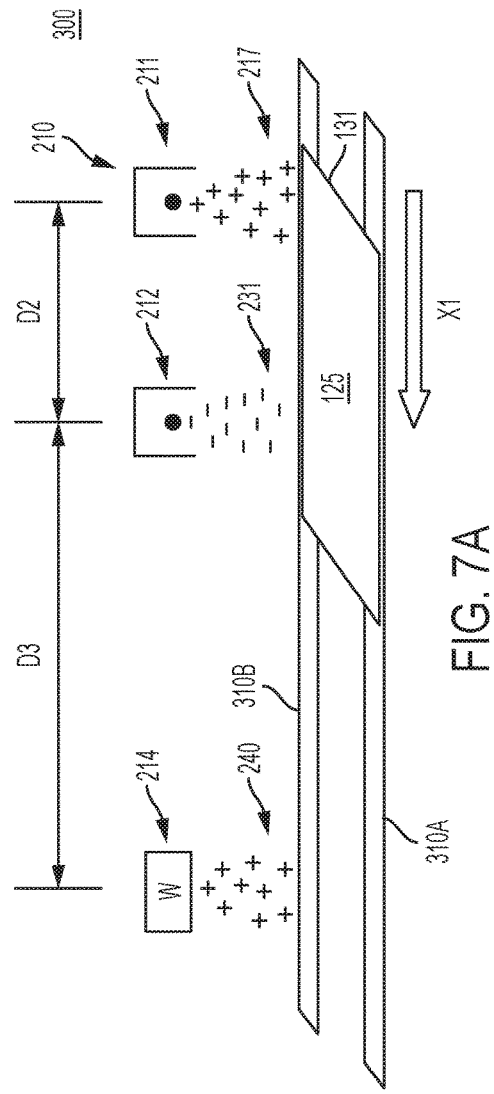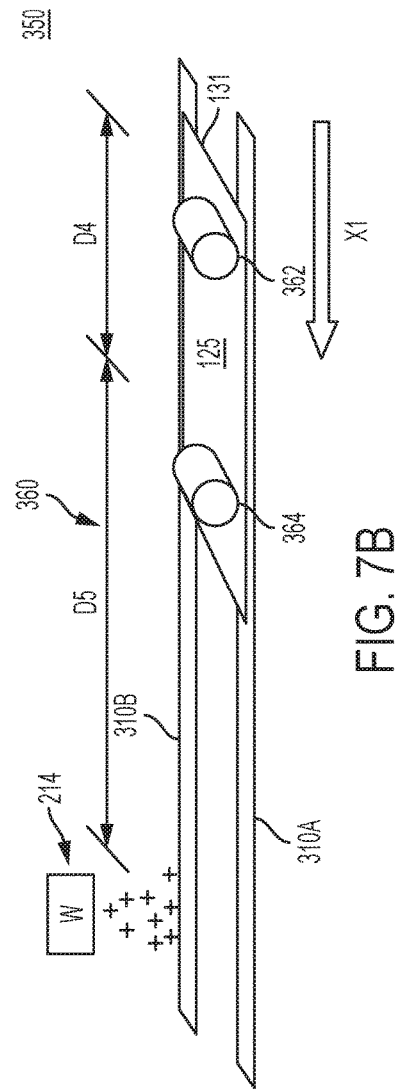

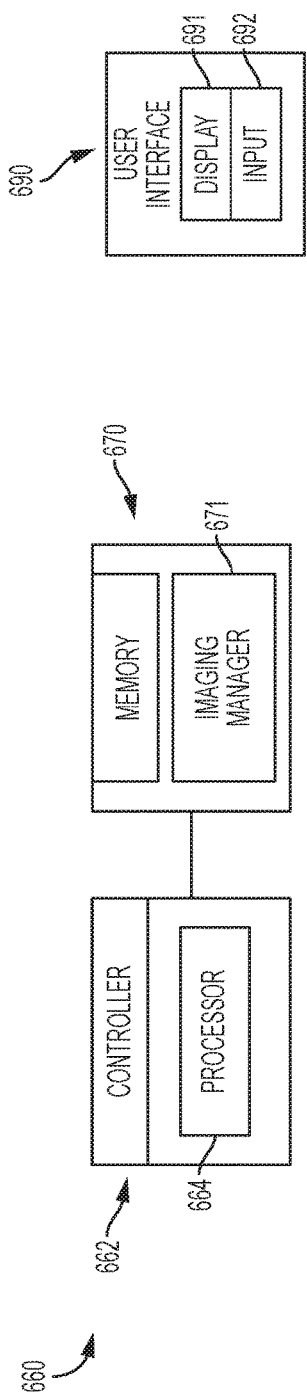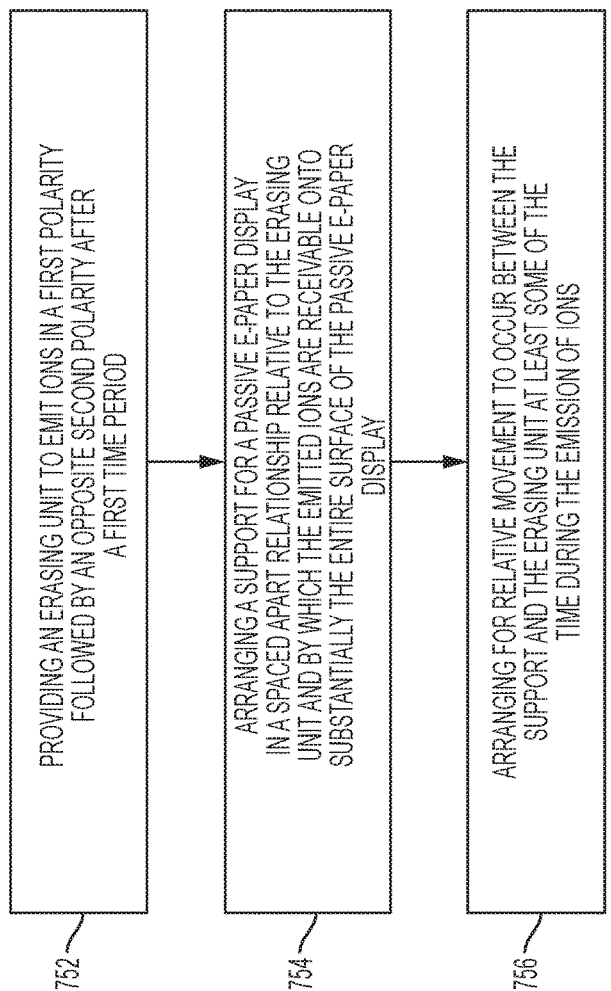

PASSIVE E-PAPER IMAGING

BACKGROUND

In some instances, electronic ("e-paper") is described as a display technology designed to recreate the appearance of ink on ordinary paper. Some examples of e-paper reflect light like ordinary paper and may be capable of displaying text and images. Some e-paper is implemented as a flexible, thin sheet, like paper. One familiar e-paper implementation includes e-readers.

BRIEF DESCRIPTION OF THE DRAWINGS

FIG. 1A is a diagram schematically representing an erasing unit, according to one example of the present disclosure.

FIG. 1B is a block diagram schematically representing a control portion, according to one example of the present disclosure.

FIG. 2A is a top plan view schematically representing a passive e-paper display medium, according to one example of the present disclosure.

FIG. 2B is a sectional view schematically representing a passive e-paper display juxtaposed with an imaging unit, according to one example of the present disclosure.

FIG. 3A is a diagram schematically representing different stages of a microcapsule of a passive e-paper display at different point in times relative to a application of ions, according to one example of the present disclosure.

FIG. 3B is a diagram schematically representing different stages of a microcapsule of a passive e-paper display at different point in times relative to multiple applications of different polarity ions, according to one example of the present disclosure.

FIG. 4 is a diagram schematically representing a state of various microcapsules of a passive e-paper display upon application of ions to erase and write the passive e-paper display, according to one example of the present disclosure.

FIG. 5 is a block diagram schematically representing a writing unit, according to one example of the present disclosure.

FIG. 7A is a diagram schematically representing an imaging device with erasing units separate from a writing unit and by which a passive e-paper display is imaged, according to one example of the present disclosure.

FIG. 7B is a diagram schematically representing an imaging device with erasing rollers separate from a writing unit and by which a passive e-paper display is imaged, according to one example of the present disclosure.

FIG. 11A is a block diagram schematically representing a control portion, according to one example of the present disclosure.

FIG. 11B is a block diagram schematically representing a user interface, according to one example of the present disclosure.

FIG. 12 is a flow diagram schematically representing a method of manufacturing an imaging device for a passive e-paper display, according to one example of the present disclosure.

DETAILED DESCRIPTION

Figure 6A:
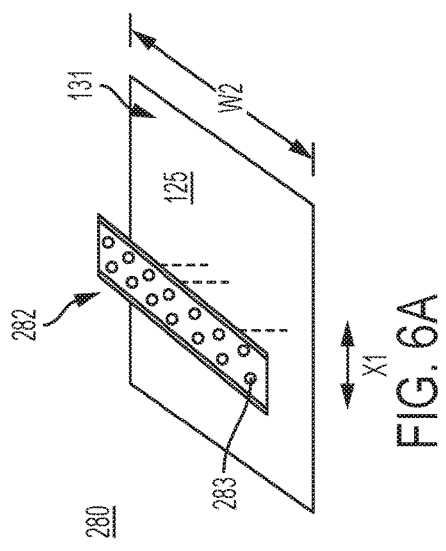
FIG. 6A is a perspective view schematically representing writing a passive e-paper display by emitting ions via addressable gates, according to one example of the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

At least some examples of the present disclosure are directed to erasing passive e-paper displays. In some examples, an imaging device for a passive e-paper display includes an erasing unit to emit ions in a first polarity followed by an opposite second polarity after a first time period. A support receivably mounts the passive e-paper display in a spaced apart relationship relative to the erasing unit and by which the emitted ions are receivable onto substantially the entire surface of the passive e-paper display. Relative movement occurs between the support and the erasing unit at least some of the time during the emission of ions.

In some examples, the support (on which the e-paper display is mountable) is stationary while erasing unit is movable. In some examples, the erasing unit is stationary while the support is movable. In some examples, both the support and the erasing unit are movable.

In some examples, the erasing unit may emit ions having a positive polarity or a negative polarity depending on a particular erasing protocol. In one example erasing protocol, in a first relative movement between the e-paper display relative to the erasing unit, a first blanket of one polarity of ions (e.g. positive) are applied to substantially an entire surface of the e-paper display. This first pass is followed by a second relative movement (e.g. a second pass) in which a second blanket of another polarity ions (e.g. negative) is applied to substantially an entire surface of the e-paper display. However, in some examples, the erasing unit may apply the ions in a different order of polarity, such as a first application of negative ions followed by a second application of positive ions. In addition, in some examples more than two "erasing" applications of ions may be implemented over substantially the entire surface of the e-paper display.

By making at least two applications of different polarity ions, the erasing unit may facilitate achieving a generally uniform appearance (e.g. all white, all black, all neutral, etc.) of the e-paper display prior to writing a new image to the e-paper display. In one aspect, this arrangement increases clarity of the new image by removing any potential residue of a prior image that might otherwise have remained in the absence of multiple "erasing" applications of ions onto e-paper display prior to writing the new image.

These examples, and additional examples, are described and illustrated below in association with at least FIGS. 1A-12.

FIG. 1A is diagram schematically representing a device 20 including an erasing unit 22, according to one example of the present disclosure. In some examples, erasing unit 22 is positionable to selectively emit ions 27 or ions 28 onto a spaced apart passive e-paper display 31. In some examples, e-paper display 31 is receivably mountable on a support 33, which is spaced apart from an ion-emitting surface 25 in a manner to cause the e-paper display 31 to be spaced apart from the ion-emitting surface 25 by a distance Dl.

As shown in FIG. 1A, passive e-paper display 31 includes a generally planar member having opposite surfaces 38, 39 (e.g. faces). In some examples, one of the surfaces 38, 39 of passive e-paper display 31 corresponds to an image-writing surface of the e-paper display 31 and one of those respective surfaces 38, 39 corresponds to an image-viewing surface of the e-paper display 31. In some examples, the image-viewable surface (i.e. image-bearing surface) corresponds to the image-writing surface of the e-paper display 31 while in some examples, the image-viewable surface (i.e. image-bearing surface) corresponds to a non-image-writable surface of the e-paper display 31. Further details of these relationships are described later in association with at least FIG. 2B.

In some examples, erasing unit 22 may emit ions 27 having a positive charge 24 or a negative charge 26, according to an erasing protocol. In one example erasing protocol, in a first relative movement (e.g. a first pass) between the e-paper display 31 relative to erasing unit 22, a first blanket of one polarity of ions (e.g. positive) are applied to substantially an entire surface (e.g. 38) of the e-paper display 31. This first pass is followed by a second relative movement (e.g. a second pass) in which a second blanket of opposite polarity ions (e.g. negative) is applied to substantially an entire surface (e.g. 38) of the e-paper display 31. However, in some examples, erasing unit 22 may apply the ions in a different order of polarity, such as a first application of negative ions followed by a second application of positive ions.

In some cases, erasing unit 24 emits positive ions 27 or negative ions 28 to have a particular distribution of the blanket charges in the direction of the card movement influencing the erase waveform to enhance erasure by taking into account, at least, the particles charge at high and low field, interaction with free charges, binder conductivity, etc.

By making at least two applications of different polarity ions, erasing unit 22 may facilitate achieving a generally uniform appearance (e.g. all white or all black, etc.) of the e-paper display 31 prior to writing a new image to the e-paper display 31. In one aspect, this arrangement increases clarity of the new image by removing any potential residue of a prior image that might otherwise remain in the absence of multiple "erasing" applications of different polarity ions onto e-paper display 31 prior to writing the new image.

In some examples, the application of ions from erasing unit 22 can be made over less than substantially entire surface of the e-paper display 31.

In some examples, device 20 includes a separate writing unit in addition to the erasing unit 22, as later described in association with at least FIGS. 7A-9. In some examples, erasing unit 22 is equipped in a manner such that it also may be employed as a writing unit, as later described in association with at least FIG. 10.

In some examples, during such relative movement the support 33 is stationary while erasing unit 22 is movable. In some examples, during such relative movement the erasing unit 22 is stationary while the support 33 is movable. In some examples, during such relative movement both the support 33 and erasing unit 22 are movable.

FIG. 1B is a block diagram schematically representing a control portion 35, according to one example of the present disclosure. In some examples, control portion 35 comprises at least some of substantially the same features and attributes as control portion 660, as later described in association with at least FIG. 11. In some examples, control portion 35 forms part of, or operates in association with, control portion 660. In some examples, control portion 35 facilitates control over the sequence and timing by which ions are emitted from erasing unit 22, as well as facilitating control over a velocity (e.g. both speed and direction) of relative movement between support 33 and erasing unit 22.

FIG. 2A is a top plan view of a display medium 34 including a passive e-paper display 31, according to an example of the present disclosure. In some examples, e-paper display 31 comprises at least some of substantially the same features and attributes as passive e-paper display 31, as previously described in association with FIG. 1A.

As further shown in FIG. 2A, in some examples e-paper display 31 bears an image 40 expressed across substantially the entire available viewing surface 38. In some examples, image 40 includes portions 42 ("Retailer Brand Name"), 44 ("Product Name"), 46 ("Product Details"), and/or 48 (QR Code graphic). Accordingly, image 40 comprises text and/or graphics. It will be understood that in this context, in some examples, graphics also refers to an image, such as specific picture of a person, object, place, etc. Moreover, the particular content of the information in image 40 is not fixed, but is changeable by virtue of the rewritable nature of the e-paper display 31. In one example, a location, shape, size of portions 42, 44, 46, 48 of an image 40 is also not fixed, but is changeable by virtue of the rewritable nature of the e-paper display 31.

As shown in FIG. 2A, in some examples, display medium 34 includes a support frame 32 secured to a portion of e-paper display 31. In some examples, frame 32 defines a generally rectangular member, as shown in FIG. 2A, which generally matches the size and shape of the periphery of the e-paper display 31. In some examples, the frame 32 is generally co-extensive with an outer portion of the e-paper display 31. In some examples, frame 32 is omitted and e-paper display 31 is free-standing without frame 32.

In some examples, frame 32 is made from a polycarbonate or polyvinylchloride (PVC) material. However, in more general terms, frame 32 is made from a resilient or semi-rigid material that is generally non-conductive and that provides mechanical strength and toughness to the e-paper display 31 for protection from bending, compression, abrasion, etc.

In at least some examples of the present disclosure, in addition to the changeable content available via e-paper display 31, fixed content 51 may be located on the frame 32. In some examples, the fixed content 51 may include a logo, name or indicia. In some examples, the fixed content 51 may relate to a retailer or other entity associated with the content writable onto the e-paper display 31. In some examples where employment, access, and/or security related information is imaged onto e-paper display 31, the fixed content 51 may include a logo, name, or indicia of a company, employer, government entity, etc. In some examples, the fixed content 31 is imaged via inkjet printheads, digital press, etc. using inks, toners, etc. that would typically be used to print on paper, plastic.

In general terms, display medium 34 includes any visual medium of content consumption. In some examples, display medium 34 includes financial transaction media (e.g. gift cards, prepaid cards, insurance cards, credit cards, etc.) or information transaction media (e.g. shelf tags, boarding passes, shipping labels, package tracking in general. In some examples, display medium 34 includes media used to gain access, establish credentials, and/or implement security.

In at least some examples of the present disclosure, e-paper display 31 is passive in the sense that it is re-writable and holds an image without being connected to an active power source during the writing process and/or after the writing is completed. Accordingly, in some examples, e-paper display 31 omits an on-board power source. In some examples, the e-paper display 31 omits internal circuitry or internal electrode arrays that might otherwise be associated producing specific images in the e-paper display 31. Instead, in some examples, the passive e-paper display 31 relies on a charge-responsive layer that is imageable via an external writing module.

Instead, as further described later, the passive e-paper display 31 is imaged in a non-contact manner in which the e-paper display 31 receives charges (emitted by a ion head) that travel through the air and then form image 40 via a response by charged particles within a layer of the e-paper display 31. After the imaging process is completed, the passive e-paper display 31 retains the image generally indefinitely and without a power supply until image 40 is selectively changed at a later time.

In at least some examples, the passive e-paper display 31 operates consistent with electrophoretic principles. With this in mind, in at least some examples, passive e-paper display 31 includes a charge-responsive layer in which charged color particles switch color when charges are selectively applied a non-contact manner (e.g. airborne migration) by an external module spaced apart from the charge-responsive layer. In some examples, the charged color particles comprise pigment/dye components. In one aspect, this arrangement is implemented via microcapsules containing a dispersion of pigmented particles in a dielectric oil. In some examples, a resin/polymer forms a matrix material that retains the microcapsules in the charge-responsive layer.

In one example, the passive e-paper display 31 further includes a conductive layer which serves as a counter-electrode on one side of the e-paper display 31. In some examples, an additional functional coating is applied to an imaging side of the e-paper 31.

One implementation of an e-paper display 31 according to above-described examples of the present disclosure is later described and illustrated in association with at least FIG. 2B.

FIG. 2B is a sectional view providing a schematic representation of an e-paper display 131 and an associated e-paper writing system 100, according to one example of the present disclosure. In some examples, this e-paper display 131 is implemented via an e-paper structure 100 having at least some of substantially the same features and attributes as e-paper display media previously described in association with at least FIGS. 1A and 2A, and in subsequent examples described in association with at least FIGS. 3A-10. Meanwhile, writing system 100 includes an imaging module 102 and is provided in FIG. 2B to generally illustrate a response of the e-paper structure 101 (of e-paper display media 131) to an erasing modality 106 and/or writing modality 104.

As shown in FIG. 2B, imaging module 102 includes writing modality 104 and erasing modality 106. In some examples, the erasing modality 106 is implemented via an ion-emitting element separate from, and independent of, a different ion-emitting element which implements the writing modality 104. In some such examples, the erasing modality 106 is implemented via a plurality of ion-emitting elements with each producing a particular polarity ion opposite than other respective ion-emitting elements. One instance is later described in association with at least FIG. 7.

In some examples, the erasing modality 106 is implemented via a single ion-emitting element for which the polarity of the ions-to-be-emitted can be selectively switched between positive and negative. One instance is later described in association with at least FIGS. 8A-8C and 9A-9D.

In some examples, the writing modality 104 and erasing modality 106 are implemented via the same ion-emitting element, and by which a polarity of the ions-to-be-emitted can be selectively switched between positive and negative. One instance is later described in association with at least FIG. 10.

In some examples, one or both of the writing modality 104 and erasing modality 106 comprises a corona-based charge ejecting device.

In some examples, instead of employing an ion-based emitting head, erasing modality 106 is implemented via an electrode that comes into close contact with, rolls across, or that is dragged along, the surface 108 in front of a separate writing modality 104. One such example is later described in association with at least FIG. 7B.

In some examples, e-paper structure 101 has an imaging surface 38 and an opposite non-imaging surface 39, as in FIGS. 1A and 2A.

In general terms, e-paper structure 101 includes a protective layer 108, a charge-responsive layer 109, and a base 110. The protective layer 108 is sometimes referred to as charge-receiving layer 108. The base 110 defines or includes a counter electrode, as further described below, which serves as a ground plane.

In some examples, the base 110 is opaque, such that the imaging surface 38 also defines a viewing side of e-paper display media 160, as represented via eye icon 22 and reference V1. However, in some examples the base 110 is at least translucent or transparent, such that non-imaging surface 39 defines the viewing side of e-paper display media 160, as represented via eye icon 22 and reference V2 shown in FIG. 4A.

In the example shown in FIG. 2B, the charge-responsive layer 109 includes a plurality of microcapsules 105 disposed within a matrix material 131 and with each microcapsule 105 encapsulating some charged black particles 124 and some charged white particles 120 dispersed within a dielectric liquid, such as an oil. In one example, as shown in at least FIG. 2B, the black particles 124 are positively charged and the white particles 120 are negatively charged.

In some examples, microparticles 120 have a color other than white and microparticles 124 have a color other than black, provided that microparticles 120 have a color different than microparticles 124. In some examples, the color of the particles is originated from pigments, while in some examples the color originates from a dye.

In some examples, charge-responsive layer 109 is formed with microcapsules 105 containing just charged particles 120 (and not containing any charged particles 124) suspended within the microcapsules 105 with an electrically neutral dye having a color different than the color of the particles 120 (e.g. white in one example). In some examples, the liquid solution is dielectric. In some instances, such dielectric solutions include isoparaffinic fluids, such as an Isopar® fluid. Likewise, in some examples, charge-responsive layer 109 is formed with microcapsules 105 containing just charged particles 124 (and not containing any charged particles 120) suspended within the microcapsules 105 with an electrically neutral dye having a color different than the color of the particles 124 (e.g. black in one example).

In some examples, via the erasing modality 106, any information stored via the microcapsules 105 is removed prior to writing information via writing modality 104. In the example shown in FIG. 2B, as the e-paper structure 101 passes under the imaging module 102, the erasing modality 106 emits positive ions 107, which act to remove negative ions that are attached to the surface 108. The positive charge erasing modality 106 also creates electrostatic forces, which drive positively charged black particles 124 away from the charge receiving layer 108 and which attract negatively charged white particles 120 toward the charge receiving layer 108. By passing the erasing modality 106 over the charge receiving layer 108, the information written to the e-paper structure 101 is erased by positioning the negatively charged white particles 120 near the top of the microcapsules 105 and pushing the positively charged black particles 124 to the bottom of the microcapsules 105.

During writing, electrical contact is made by a ground resource with exposed portions of base 110 (including a counter electrode) to allow biasing of the writing modality 104 while it applies charges to charge receiving layer 108 during the writing process.

Microcapsules 105 exhibit image stability via chemical adhesion between microparticles and/or between the particles and the microcapsule surface. For example, microcapsules 105 can hold text, graphics, and images indefinitely without using electricity, while allowing the text, graphics, or images to be changed later.

The structure, materials, and dimensions of the various layers and components of e-paper structure 101 are chosen for specific design criteria. In one example, the transparent charge receiving layer 108 is composed of a transparent polymer and can have a thickness between 50 µm and 250 µm. In some examples, the transparent charge receiving layer 108 is also composed of a material that holds charges or is porous or semi-porous to charges and/or ions.

In some examples, the diameter of each microcapsule 105 is substantially constant within charge-responsive layer 109 of e-paper structure 101 and, in some examples, the thickness of charge-responsive layer 109 is between about 20 µm and about 100 µm, such as 50 µm. In some examples, base 110 has a thickness between about 20 µm and about 1 mm, or larger depending on how e-paper display 131 is to be used. In some examples, the protective or charge-receiving layer 108 is about 5 microns thick.

In one aspect, base 110 is structured to provide enough conductivity to enable counter charges to flow during printing. As such, in general terms, base 110 comprises a member including at least some conductive properties. In some examples, base 110 comprises a non-conductive material that is impregnated with conductive additive materials, such as carbon nanofibers or other conductive elements. In some examples, base 110 comprises a conductive polymer, such as a urethane material or a carbonite material. In further examples, base 110 is made from a conductive polymer with carbon nanofibers, to provide flexibility with adequate strength.

In some examples, base 110 is primarily comprised of a conductive material, such as an aluminum material and therefore is impregnated or coated with additional conductive materials.

In some examples, whether conductivity is provided via coating, impregnation or other mechanisms, the body of base 110 is formed from a generally electrically insulative, biaxially-oriented polyethylene terephthalate (BOPET), commonly sold under the trade name MYLAR, to provide flexibility and strength in a relatively thin layer.

In some examples, the base 110 is opaque or is transparent, depending on the particular implementation of the e-paper display medium. With further reference to FIG. 2B, in some examples, base 110 is opaque, such that image-writing surface 38 of e-paper display 31 also serves as an image-viewing surface, as represented via eye icon 52 and reference V1 in FIG. 2B. However, in some examples, base 110 is provided as a transparent element, such that the bottom surface 39 of e-paper display 31 serves as an image-viewing surface of the e-paper display 131 as represented via eye icon 52 and reference V2 in FIG. 2B. In some examples, in this latter arrangement, layer 125 is opaque.

In some examples, the base 110 comprises a generally resilient material, exhibiting flexibility and in some implementations, semi-rigid behavior. In some examples, the base 110 comprises a rigid material.

In some examples, the protective, charge receiving layer 108 is made from a semi-conductive polymer having a resistivity of about $10^9$ Ohm-cm or a porous layer that enables ion charges to pass through the layer 108 during erasing and/or writing cycles.

FIG. 2B also shows one example writing operation performed by the writing modality 104 in which the deposition of charges influences the distribution of charged pigments/particles within affected microcapsules 105. In one aspect, the writing modality 104 is designed and operated to selectively eject electrons 114, shown as black bars, toward the charge receiving surface 108, when a region of the e-paper structure 101 located beneath the writing modality 104. As the electrons 114 reach the surface 108, the negatively charged white particles 120 are repelled and driven away from the charge receiving surface 108, while the positively charged black particles 124 are attracted to the negatively charged electrons/ions 114 and driven toward the charge receiving surface 108. Areas of charge-receiving layer 108 will retain a positive charge, and therefore a white appearance in this example. Furthermore, as the writing modality 104 passes over microcapsules 105 while ejecting electrons, the negatively charged white particles 120 are repelled away from the insulating layer and the positively charged black particles 124 are driven toward the charge receiving layer 108.

In some cases, charges 116 gradually decline after generating the image 40.

The e-paper writing system 100, as shown in FIG. 2B, is not limited to implementations in which the writing modality 104 discharges electrons and the erasing modality 106 erases information with positive charges. Instead, in some examples, the microcapsules 105 in matrix material 131 of the charge-responsive layer 109 of e-paper structure 101 are composed of negatively charged black particles 124 and positively charged white particles 120. In such examples, the writing modality 104 is designed to produce positive ions for forming a new image, while the erasing modality 106 uses negative charges to erase prior imagery from passive e-paper display 131.

In some examples, charge receiving layer 108 comprises a protective element or coating, which protects the charge-responsive layer 109 (including microcapsules 105) from mechanical damage, pressure and impact, and from collecting tribo charges. It also is designed to reduce increases in dot size due to field screening during charging (the "blooming effect"). In one implementation, the protective charge-receiving layer 108 includes semiconducting characteristics which allow for a controlled decay of the latent charge image, such that the layer 108 gradually dissipates the charges to the ground defined by base 110. The resistivity of the layer 108 is designed to enable fast movement of charges through layer 108. In some instances, the charges will be transferred to ground at least partially defined by base 110 through the layer 109. In particular, the matrix material 131 of charge-responsive layer 109 is selected to provide the desired optical and mechanical characteristics, as well as the desired electrical resistivity.

It will be understood that in some examples, erasing modality 106 in FIG. 2B acts as a general schematic representation of a plurality of erasing units, each emitting ions of a different polarity. One example implementation of such an erasing modality 106 is described in association with FIGS. 4A and 7A.

In some examples, the erasing of one surface 125 of passive e-paper display 131 is performed without heating during (or before) ions are emitted onto and received by surface 125. Moreover, in some examples, the matrix material 131 in which microcapsules reside and/or any substances in which microparticles 120, 124 are suspended within each microcapsule omits (i.e. does not include) a thermo-reversible gel. Accordingly, the switching of color microparticles toward or away surface 125 of passive e-paper display 131 occurs without the aid of a thermo-reversible gel.

FIG. 3A is a diagram 140 schematically representing different stages of a microcapsule 105 of a passive e-paper display relative to an application of negative ions 142, according to one example of the present disclosure.

In this particular example, the black microparticles 124 are negatively charged and the white microparticles 120 are positively charged. The first stage in FIG. 3A corresponds to a microcapsule 105 presenting a partially black, partially appearance at surface 144 as seen by a viewer 52. The second stage corresponds to the application of negative ions 142 via an erasing unit, such as erasing unit 22 in FIG. 1A, erasing modality 106 (FIG. 2B), or one of the other erasing units/modalities as later described in association with at least FIGS. 4, 7A-10.

In the second stage, the negative ions 142 at the surface 144 of the microcapsule 105, repel or drive the negatively charged black microparticles 124 toward the other side 145 of the microcapsule 105 (as represented by arrow A) while attracting the positively charged white microparticles 120 to migrate toward the negative ions 142 at surface 144, as represented by arrow B. This process may continue until all of the positively charged white microparticles 120 have migrated to the first surface 144 of microcapsule 105 and all of the negatively charged black microparticles 124 have migrated to the second surface 145 of microcapsule.

However, in some instances, at least some of the microparticles (120, 124) that should migrate to an opposite side of a microcapsule 105 remain in place. For instance, the third stage in FIG. 3A corresponds to this situation in which at least some microparticles (e.g. at least one black microparticle 126) did not migrate to the opposite surface 145 of microcapsule 105, thereby preventing surface 125 (of e-paper display 131) from having a generally uniform or blank appearance as one would intend or expect from an erasing action. In some instances, this microparticle 126 fails to migrate the mechanical and/or chemical adhesion forces between the microparticle 126 and the interior environment of the microcapsules 105 are stronger than the electrical forces exerted by ions 142 at surface 125 of the e-paper display 131. In some instances, such stray microparticles 126 tend to be smaller in size than other microparticles, with such smaller microparticles exhibiting stronger mechanical and chemical adhesive forces and exhibiting smaller electrical charges due to their smaller surface areas. Consequently, such microparticles 126 may inhibit a thorough erasing of surface 125 of e-paper display 131.

FIG. 3B is a diagram schematically representing different stages of a microcapsule of a passive e-paper display 131 relative to multiple applications of different polarity ions, according to one example of the present disclosure. The first stage in FIG. 3B corresponds to the first stage shown in FIG. 3A. However, prior to application of negative ions to erase the microcapsule 105 (as in second stage of FIG. 3A), in some examples positive ions 152 are applied to microcapsule 105 to cause migration of negatively charged black microparticles 124 to surface 145 and of positively charged white microparticles 120 to surface 144, as represented in second stage of FIG. 3B. When complete, this initial erasing action gives the microcapsules 105, and consequently one surface 125 of an entire e-paper display 131, a generally uniform black appearance as shown in the third stage in FIG. 3B. In one aspect, ions 152 shown in the second stage in FIG. 3B are applied via an erasing unit or modality, such as those previously described.

In addition, by driving all of the black microparticles 124 to surface 144 as shown in the third stage, the black microparticles 124 become enmeshed and chemically/mechanically adhered relative to any potentially stray microparticles 126. Accordingly, upon a second application of ions 162 (e.g. negative ions) to the surface 125 of the e-paper display 131 as shown in the fourth stage in FIG. 3B, all of the black microparticles 124 are driven away from surface 144 of microcapsule 105 to opposite surface 145. Meanwhile, the second application of ions 162 attracts the positively charged white microparticles 120 to surface 144, thereby producing a generally uniformly white or blank appearance at surface 125 of e-paper display 131 as shown in the fifth stage of FIG. 3B.

Accordingly, via this double erasing action, the surface 125 of the e-paper display 131 is deemed to be erased, i.e. made blank via the generally uniform appearance of one color of microparticles (e.g. 120). At least some examples of the present disclosure achieve this arrangement via at least two applications of different polarity ions in which a first application is made with first polarity ions and a second application is made with second opposite polarity ions.

FIG. 4 is a diagram 200 schematically representing a state of various microcapsules of a passive e-paper display 231 upon an imaging device 210 applying ions to erase and write to the passive e-paper display 231, according to one example of the present disclosure. In some examples, e-paper display 231 comprises at least some of substantially the same features and attributes as e-paper display 131 in FIGS. 2B-3B.

In some examples, the imaging device 210 includes a first erasing unit 211, a second erasing unit 212, and a writing unit 214. In this example, within each microcapsule 105, the black microparticles 124 are negatively charged and the white microparticles 120 are positively charged. Accordingly, as relative movement between e-paper display 231 and imaging device 210 occurs (as represented by directional arrow X1), the first erasing unit 211 emits positive ions 217 to produce a layer of positive ions 218 at receiving surface 125 of e-paper display 231. These surface charges 218, in turn, draw negatively charged black microparticles 124 to surface 125 to help create a generally uniformly black appearance at surface 125, while also facilitating at least temporary adhesion of the black microparticles 124 relative to each other.

As further shown in FIG. 4, portion 220 represents the gradual dissipation over time of positive charges 218 at surface 125, as represented by the smaller and/or lighter plus symbols (+) spanning from right to left as e-paper display 231 travels from right to left in FIG. 4. In some examples, the distance D2 between the first erasing unit 211 and the second erasing unit 212 depends on several factors. One factor includes a velocity during relative movement of the passive e-paper display 231 relative to the erasing units 211 and 212, which in turn determines a time period (e.g. elapsed time) between when ions 217 emitted from erasing unit 211 contact e-paper display 131 and when ions 231 emitted from erasing unit 212 contact e-paper display 131. Another factor influencing determination of distance D2 includes the speed at which electrophoretic movement of the black microparticles 124 occurs, which therefore affects the total time for all of the black microparticles 124 to migrate to the other surface 145 of the microcapsules 105. Another factor by which distance D2 is determined includes the amount of time to achieve a desired level of dissipation of charges 218 at surface 125. In one aspect, positive charges 218 dissipate from surface 125 as they flow to the counter electrode (e.g. at base 110 in FIG. 2B) located on the other side of the microcapsules 105. The flow time, in turn, depends at least on the resistivity of the layer of microcapsules 105 and the resistivity of the charge-receiving layer 108 (FIG. 2B).

In some examples, erasing unit 211 and erasing unit 212 share the same collector electrical potential, i.e. have the same ground. In some examples, erasing unit 211 and erasing unit 212 each have their own, different collector potential. In these latter examples, selection of distance D2 also is at least partially determined according to a length of the e-paper display 131, wherein the length is measured in the direction of travel (e.g. X1) of the e-paper display 131.

In some examples, first erasing units 211 and second erasing units 212 include a corona (216, 231 respectively) to generate and emit ions (217, 231 respectively), as shown schematically in FIG. 4. However, it will be understood that in some examples, first and second erasing units 211, 212 may include ion-generating modalities other than a corona.

With continued reference to FIG. 4, as further relative movement between e-paper display 231 and imaging device 210 occurs (as represented by directional arrow X1), the first erasing unit 212 applies negative ions 232 to produce a layer of negative charges 233 at receiving surface 125 of e-paper display 231. These negative charges 233, in turn, draw positively charged white microparticles 120 to surface 125 while pushing away negatively charged black microparticles 124 to thereby produce a generally uniformly white or neutral appearance at surface 125. In one aspect, because the negatively charged black microparticles 124 were aggregated together per action of first erasing unit 211, then they tend to move together upon action of second erasing unit 212 with the electric adhesive forces among black microparticles 124 overcoming chemical/mechanical adhesive forces (to which some individual microparticles 124 might be subject), thereby minimizing or eliminating the phenomenon of undesired stray microparticles (e.g. 126 in FIG. 3A) staying at surface 125.

As further shown in FIG. 4, portion 235 represents the gradual dissipation of negative charges at surface 125 which occurs over time, as represented by smaller and/or lighter plus symbols (+) as e-paper display 231 moves from right to left in FIG. 4.

In some examples, the distance D3 between the second erasing unit 212 and the writing unit 214 depends on several factors. One factor includes a velocity during relative movement of the passive e-paper display 231 relative to the erasing unit 212 and writing unit 214, which in turn determines a time period (e.g. elapsed time) between when ions 231 emitted from erasing unit 212 contact e-paper display 131 and when ions 240 emitted from writing unit 214 contact e-paper display 131. Another factor influencing determination of distance D3 includes the speed at which electrophoretic movement of the white microparticles 124 occurs, which therefore affects the total time for all of the white microparticles 120 to migrate to the other surface of the microcapsules 105. Another factor by which distance D3 is determined includes the amount of time to achieve a desired level of dissipation of charges 233 at surface 125. In one aspect, negative charges 233 dissipate from surface 125 as they flow to the counter electrode (e.g. at base 110 in FIG. 2B) located on the other side (e.g. 145) of the microcapsules 105 according to a collector potential. The flow time, in turn, depends at least on the resistivity of the layer of microcapsules 105 and the resistivity of the charge-receiving layer 108.

In some examples, erasing unit 212 and writing unit 214 share the same collector potential. In some examples, erasing unit 212 and writing unit 214 each have their own, different collector potential. In these latter examples, then selection of distance D3 also is at least partially determined according to a length of the e-paper display 131, wherein the length is measured in the direction of travel of the e-paper display 131.

In some examples, a speed of electrophoretic movement of the black microparticles 124 is three times faster than a speed of electrophoretic movement of the white microparticles 120, and therefore a distance D2 may be less than distance D3 because less time may be involved for charges 218 to dissipate from surface 125.

As further shown in FIG. 4, after charges 233 have substantially dissipated at surface 125, positive ions 240 emitted by writing unit 214 form a pattern 236 corresponding to an image (e.g. 40 in FIG. 2A) on surface 125 of e-paper display 231, thereby causing migration of black microparticles 124 to appropriate areas of the surface 125, and the associated driving of white microparticles 120 away from surface 125.

In some examples, the application of ions via the first erasing unit 211 need not cause a complete migration of all black microparticles 124 to surface 125. Rather, in some instances, the amount of ions (based on time, intensity, and distance) emitted by first erasing unit 211 is purposed to cause at least a threshold percentage of microparticles (e.g. black microparticles 124) to migrate to surface 125. In one aspect, the threshold percentage corresponds to a relative volume of microparticles which are sufficient to remove or prevent stray microparticles (e.g. 126 in FIG. 3A) without necessarily involving the migration of all microparticles 124 to surface 125. In some instances, performing erasure according to a threshold percentage may enable applying ions from first erasing unit 211 for a shorter period of time, and also consequently reduce the distance D2 between first erasing unit 211 and second erasing unit 212, because it will take less time for migration of the threshold percentage of microparticles (as compared to migration of all black microparticles). In some examples, the threshold percentage falls within a range of 50 to 99 percent of all black microparticles. In some examples, the threshold percentage is at least 60 percent. In some examples, the threshold percentage is at least 70 percent. In some examples, the threshold percentage is at least 80 percent.

In some examples, to the extent that first erasing unit 211 may be operated in association with such a threshold percentage, then second erasing unit 211 may be operated for a shorter period of time and/or less intensity to produce the generally uniform appearance of white or neutral microparticles 120 prior to operation of writing unit 214. In this way, the imaging module 210 can "erase" the e-paper display 131 faster than in some previously described examples, in which all black microparticles 124 are brought to surface 125.

FIG. 5 is a block diagram schematically representing a writing unit 250, according to one example of the present disclosure. In some examples, writing unit 250 provides just one example of the writing unit 214 in FIG. 4 and/or one of the writing units described in association with at least FIGS. 7A-10. As shown in FIG. 5, writing unit 250 includes a housing 252 to arrange an ion generating unit 260 and addressable gates 262. In some examples, the ion generating unit 260 comprises a corona, while in some examples, the ion generating unit 260 comprises other modalities for generating ions. In some examples, ion generating unit 260 includes multiple, separate ion generating elements.

In some examples, ions generated via unit 260 engage a plurality of addressable gates 262, which permit ions to exit surface 253 of housing 252 according to which gates 262 are selectively activated. In some examples, each gate 262 may take the form of a hole or a nozzle structure, which can be electrically closed or opened based on selectable relative voltages of an associated electrode structure which exerts an electric field at the gate. An open gate permits passage of ions while a closed gate prevents passage of ions.

In some examples, ions are generated specific to each addressable gate while in some examples, ions are generated generally (such via a single ion generating unit) for use with any of the addressable gates.

In some examples, writing unit 252 is implemented with at least some of substantially the same features and attributes as in PCT Publication WO 2015/116226, published on Aug. 6, 2015 under title E-PAPER IMAGING VIA ADDRESSABLE ELECTRODE ARRAY.

Accordingly, in one aspect, FIG. 5 schematically represents the emission of groups of ions (264A, 264B, 264C) in a selected pattern in order to form a desired image on an e-paper display 231.

In some examples, the plurality of gates 262 has a width (W1) to emit ions in a span up to an entire width of a passive e-paper display 131, as further shown in FIG. 5. One implementation of the addressable gates 262 is schematically represented in FIG. 6A in which set 282 of gates 283 is sized and shaped to span at least a width of the e-paper display 131, and as such may be referred to as a page wide set 282 of addressable gates 283. As represented by arrow X1, relative movement between the set 282 of gates 283 and e-paper display 131 will result in application of ions in a selectable pattern according to which gates 283 are activated (i.e. open) at any given point in time.

In some examples, a substantial percentage of, or all of, the gates 283 can be opened to permit the passage of ions such that the set 282 of addressable gates 283 applies a blanket of ions to at least substantially the entire surface of the e-paper display 131. In such implementations, the set 282 of addressable gates 283 can mimic the behavior of a general ion-emitter (e.g. corona or other modality) not capable of emitting selective patterns of ions. Accordingly, some implementations of a writing unit 250 with a set 282 of addressable gates 283 also may act as an erasing unit, such as later described in association with at least FIG. 10.

Figure 6B:
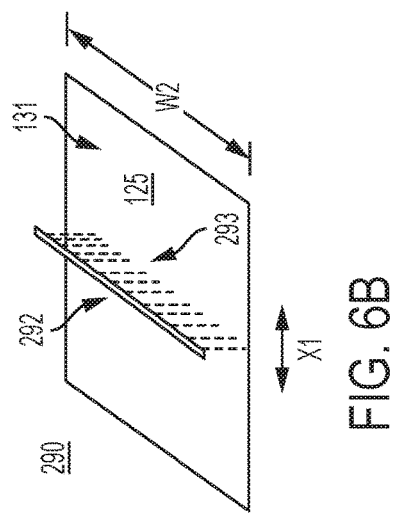
FIG. 6B is a perspective view schematically representing erasing a passive e-paper display by emitting ions via a corona, according to one example of the present disclosure.

FIG. 6B is a diagram including a perspective view schematically representing erasure of a passive e-paper display 131 by emitting ions via an ion generating unit 292, according to one example of the present disclosure. As shown in FIG. 6B, ion generating unit 292 includes a corona arranged with its length generally transverse to a direction (arrow X1) of relative movement between the corona and the e-paper display 131. In one aspect, a length of the corona generally matches the width (W2) of the e-paper display 131. Upon activation, the corona produces ions along its length, thereby forming a blanket 293 of ions which become applied to the e-paper display 131. Upon emitting the blanket 293 of ions for an appropriate amount of time, and assuming an appropriate velocity of relative movement (arrow C1), the blanket 293 of ions may induce the e-paper display 131 to exhibit a generally uniform appearance of one color of microparticles (e.g. either neutral or black, depending on their respective charge) at surface 125.

Accordingly, in some examples, ion generating unit 292 may function as an erasing unit as described elsewhere in the present disclosure, such as erasing unit 22 (FIG. 1A), erasing units 211, 212 (FIGS. 4, 7A), and/or erasing unit 412 (FIGS. 8A-8C and 9A-9D).

FIG. 7A is a diagram 310 schematically representing an imaging device 210 with erasing units 211, 212 separate from a writing unit 214 and by which a passive e-paper display 131 is imaged, according to one example of the present disclosure. In some examples, the imaging device 210 generally corresponds to the imaging device 210 as shown and described in association with FIG. 4, except with FIG. 7A further depicting the spatial relationships among erasing units 211, 212, writing unit 214, and e-paper display 131. Accordingly, FIG. 7A further depicts a pair of conveying structures 310A, 310B for conveying e-paper display 131 relative to the erasing units 211, 212 and writing unit 214. In some examples, each conveying structure 310A, 310B comprises a movable element, such as belt or chain of linked elements.

Consistent with the behavior previously described and illustrated in association with at least FIGS. 3B-4, the double erasing action of different polarity erasing units 211, 212 produces a generally uniform appearance at surface 125 of e-paper display 131 prior to a writing unit (e.g. 214 in FIG. 4) writing a new image on e-paper display 131.

FIG. 7B is a diagram 350 schematically representing an imaging device 360 with erasing elements 362, 364 separate from a writing unit 214 and by which a passive e-paper display 131 is imaged, according to one example of the present disclosure. In some examples, imaging device 360 comprises at least some of substantially the same features and attributes as imaging device (FIG. 7A), except including contact-based, conductive erasing elements 362, 364 instead of contact-less, ion-emitting erasing units 211, 212. In some examples, the contact-based, conductive erasing elements 362, 364 comprise rollers, as shown in FIG. 7B.

In a manner similar to the example of FIG. 7A, erasing elements 362 and 364 are operated with opposite polarities. Accordingly, in some examples, erasing element 362 exhibits a positive polarity and erasing element 364 exhibits a negative polarity while in some examples, erasing element 362 exhibits a negative polarity while erasing element 364 exhibits a positive polarity.

In one aspect, the erasing elements 362, 364 are spaced apart by a distance D4, which may or may not be the same as distance D2 in FIG. 7A, as the erasing element 362 may deliver charges to the surface 125 of the e-paper display 131 at a different rate and/or intensity than erasing units 211, 212 (FIG. 7A). In one aspect, the second erasing element 364 is spaced apart from the writing unit 214 by a distance D5, which may or may not be the same as distance D3 in FIG. 7A, as the erasing element 364 may deliver charges to the surface 125 of the e-paper display 131 at a different rate and/or intensity than erasing unit 212 (FIG. 7A). In general terms, the distances D4 and D5 are determined according to at least substantially the same or according to analogous factors used to determine distances D2 and D3 in association with at least FIGS. 4 and 7A.

While not depicted in FIG. 7B, in some examples each conductive erasing element 362, 364 may be implemented as a conductive brush or conductive wires or analogous conductive structure that maintains slidable contact with the surface of the e-paper display 131.

In some examples, each conductive erasing element 362, 364 can take the form of a floating charge roller, such as but not limited to, such elements disclosed in Gila et al. U.S. Pat. No. 7,050,742 issued on May 23, 2006.

Figure 8A:
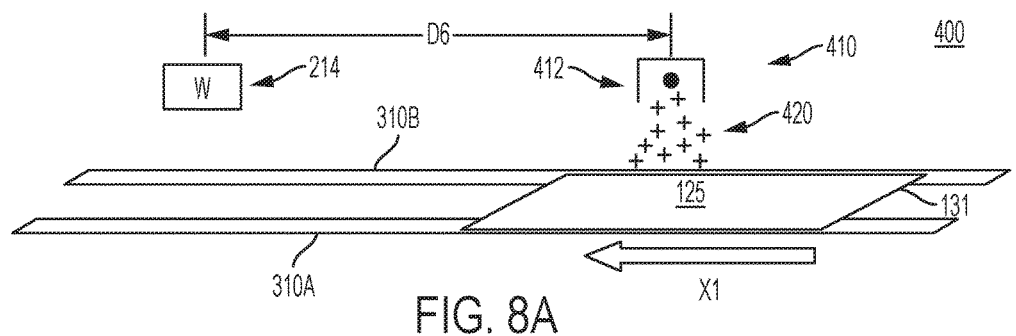
FIGS. 8A-8C provide a series of diagrams schematically representing an imaging device with a multi-use erasing unit separate from a writing unit and by which a passive e-paper display is imaged, according to one example of the present disclosure.
Figure 8B:
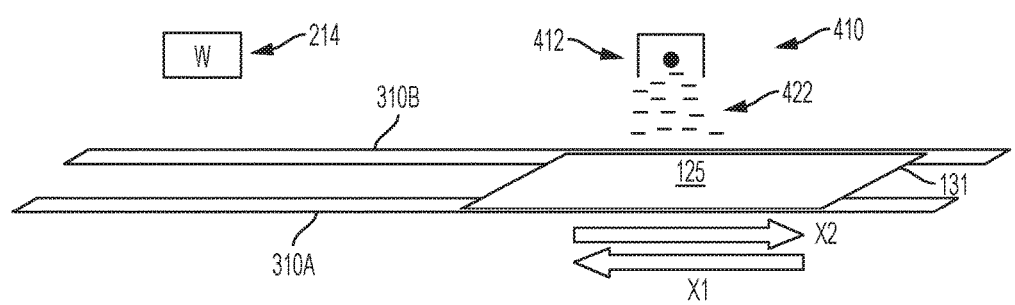
Figure 8C:
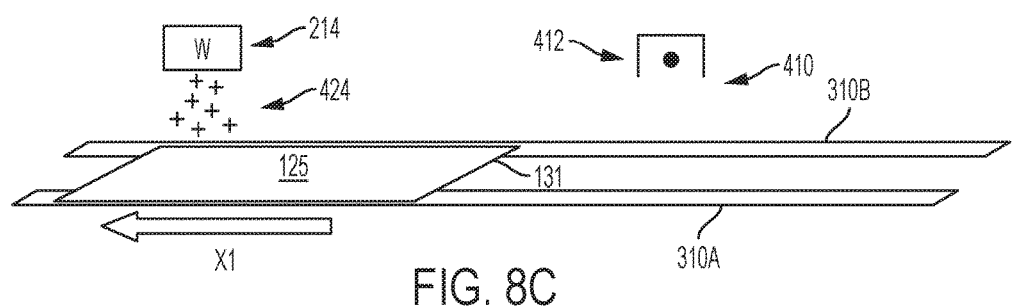

FIG. 8A-8C provide a series of diagrams 400 schematically representing an imaging device 410 with a multi-use erasing unit 412 separate from a writing unit 214 and by which a passive e-paper display 131 is imaged, according to one example of the present disclosure. In some examples, imaging device 410 comprises at least some of substantially the same features and attributes as imaging device 210 in FIG. 7A, except for providing a multi-use erasing unit 412 instead of two separate erasing units 211, 212. The multi-use erasing unit 412 comprises an ion-generating element which can selectably emit either positive ions or negative ions. Accordingly, in some examples, in a state shown in FIG. 8A, the erasing unit 412 emits ions 420 having a first polarity (e.g. positive in the example shown) during which relative movement occurs between the erasing unit 412 and the entire passive e-paper display 131, as represented by directional arrow X1. This action induces the passive e-paper display 131 to switch all of it's negatively charge microparticles (e.g. black in one example) to the surface 125, thereby giving the surface 125 a generally uniform appearance corresponding to the color (e.g. black) of those microparticles. In one aspect, this action is substantially the same as previously described in association for erasing unit 211 in FIG. 4.

This maneuver is followed by the passive e-paper display 131 being returned to a starting position relative to erasing unit 412, as represented per directional arrow X2 in FIG. 8B, and during which no ions are emitted from erasing unit 412. In other words, erasing unit 412 is in a non-emission mode during travel of e-paper display 131 in the return/second travel direction. As further shown in FIG. 8B, the erasing unit 412 is switched to emit ions 422 having a second polarity (e.g. negative in the example shown) during which relative movement occurs between the erasing unit 412 and the entire passive e-paper display 131, as represented by directional arrow X1. This action induces the passive e-paper display 131 to switch all of it's positively charge microparticles (e.g. white in one example) to the surface 125, thereby giving the surface 125 a generally uniform appearance, such as an all-white or neutral appearance. In one aspect, this action is substantially the same as previously described in association for erasing unit 212 in FIG. 4.

Upon the passive e-paper display 131 traveling distance D6, relative movement (as represented by arrow X1) between the e-paper display 131 and the imaging device 410 continues until the writing unit 214 emits ions 424 (e.g. positive in the example shown) onto the e-paper display 131 in a selectable pattern to form an image thereon as shown in FIG. 8C.

As previously noted, the distance D6 corresponds to the amount of time (at least partially dependent on the relative velocity of e-paper display 131) for surface charges deposited by the second action of erasing unit 412 to dissipate and for completion of the induced migration of microparticles to surface 125 resulting from the most recent erasure action. In more general terms, the distance D6 may determined according to at least substantially the same or according to analogous factors used to determine distances D2 and D3 in association with at least FIGS. 4 and 7A. In one aspect, the distance D6 may or may not be the same as distance D3 in FIG. 7A.

Figure 9A:
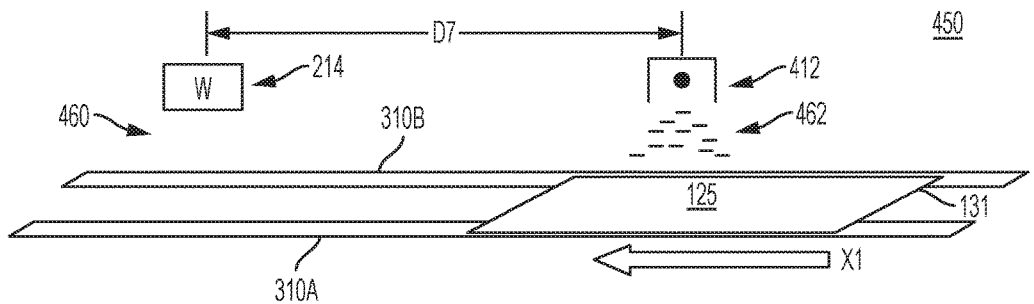
FIGS. 9A-9D provide a series of diagrams schematically representing an imaging device with a multi-use erasing unit separate from a writing unit and by which a passive e-paper display is imaged, according to one example of the present disclosure.
Figure 9B:
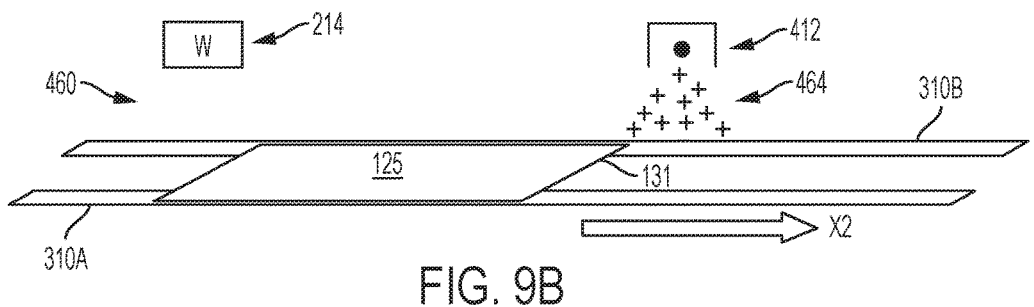
Figure 9C:
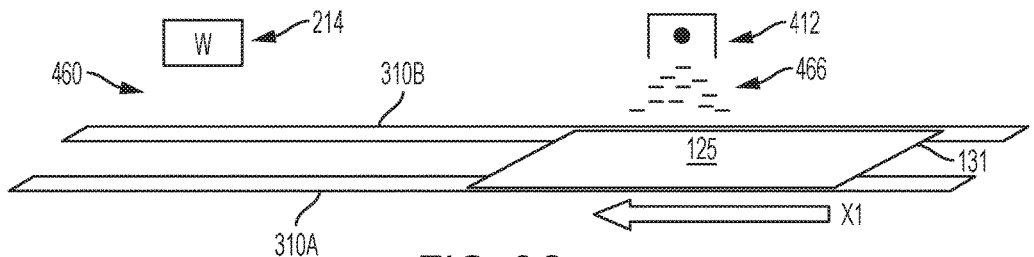
Figure 9D:
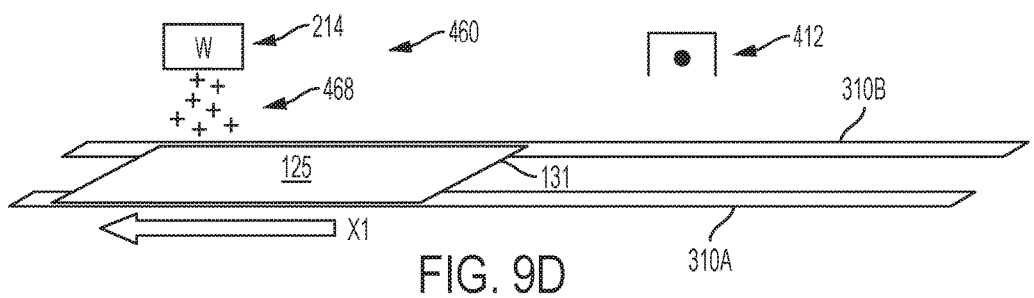

FIGS. 9A-9D provide a series of diagrams 450 schematically representing an imaging device 460 with a multi-use erasing unit 412 separate from a writing unit 214 and by which a passive e-paper display 131 is imaged, according to one example of the present disclosure. In some examples, imaging device 460 comprises at least some of substantially the same features and attributes as imaging device 410 in FIGS. 8A-8C, except for providing a multi-use erasing unit 412 being employed on more than two passes of the e-paper display 131. In a first pass, erasing unit 412 emits a blanket of negative ions 462 onto surface 125, as e-paper display 131 moves in direction X1, as shown in FIG. 9A. In a second pass, as e-paper display 131 moves in an opposite/reverse direction X2, the erasing unit 412 emits a blanket of positive ions 464 onto surface 125, as shown in FIG. 9B. In a third pass as shown in FIG. 9C, e-paper display 131 is moved again in direction X1 while erasing unit 412 emits a blanket of negative ions 466 onto surface 125 to produce a generally uniform white or neutral appearance suitable to receive a new image from writing unit 214.

Among other potential factors, performing multiple erasing actions such as in the example of FIG. 9 to cycle the microparticles (120, 124) between different positions within the microcapsules (e.g. 105) in the e-paper display 131 is believed to enhance a complete erasure of surface 125 of e-paper display 131. After the erasure actions are completed, writing unit 214 emits ions 468 onto surface 125 to form a new image on e-paper display 131, as shown in FIG. 9D.

In some examples, distance D7 in FIG. 9A is determined according to at least some of substantially the same factors affecting the determination of distance D6 in FIG. 8A. In one aspect, the distance D7 may or may not be the same as distance D6 in FIG. 8A.

Figure 10A:
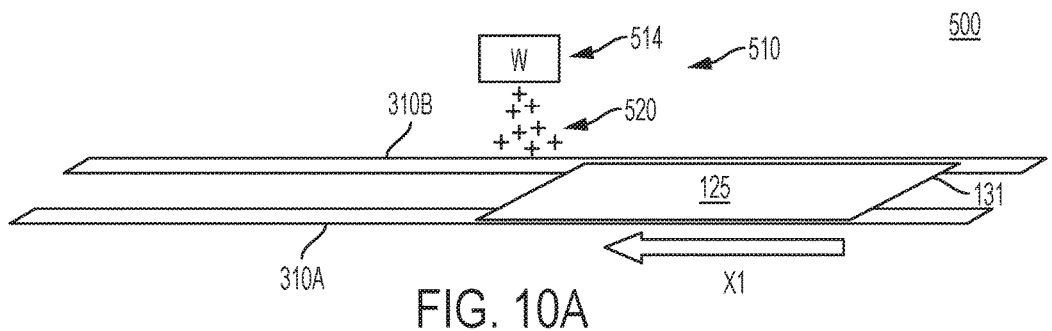
FIGS. 10A-10C provide a series of diagrams schematically representing an imaging device with an ion-emitting unit employable in an erasing mode and/or a writing mode, and by which a passive e-paper display is imaged, according to one example of the present disclosure.
Figure 10B:
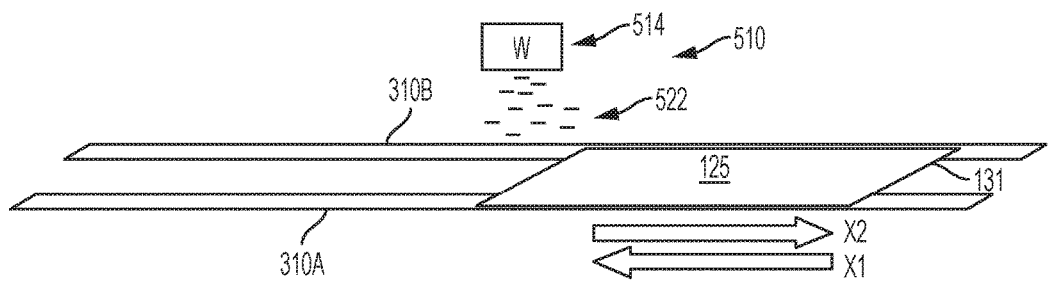
Figure 10C:
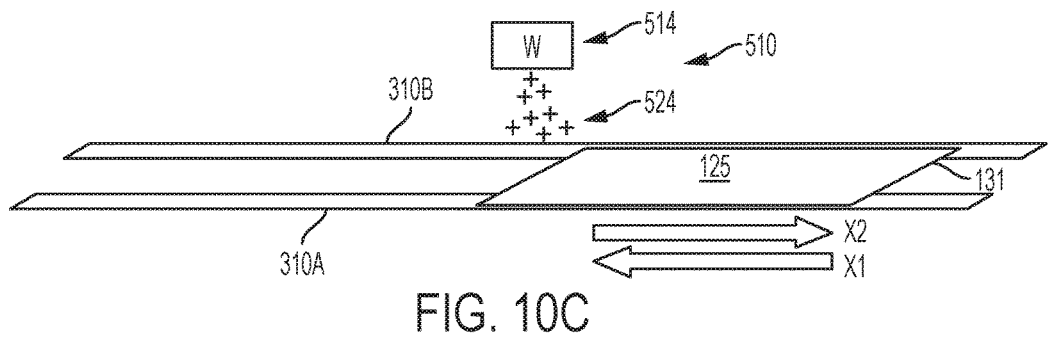

FIGS. 10A-10C provide a series of diagrams 500 schematically representing an imaging device 510 with an ion-emitting unit 514 employable in an erasing mode and a writing mode, and by which a passive e-paper display 131 is imaged, according to one example of the present disclosure. In some examples, ion-emitting unit 514 comprises at least some of substantially the same features and attributes as writing unit 214 (at least FIG. 4) and/or writing unit 250 (FIG. 5). However, as implemented in imaging device 510, the ion-emitting unit 514 is selectively operated in different polarities and/or different ion-emitting patterns depending on whether the unit 514 is operating in an erasing modality (e.g. 106 in FIG. 2B) or a writing modality (e.g. 104 in FIG. 2B). For instance, as shown in FIG. 10A, in a first pass of e-paper display 131 relative to unit 514, ions 520 having a first polarity (e.g. positive in the example shown) are emitted onto e-paper display 131 to induce at least substantially the entire surface 125 to become populated with negatively charged microparticles, such as black microparticles 124 in one example (e.g. FIG. 4).

In some examples, during this first pass the ions 520 are emitted in the form of a blanket extending across an entire width of the e-paper display such that ions 520 are received onto at least substantially the entire surface 125 of e-paper display 131. In some examples, when the ion-emitting unit 514 comprises a writing unit, such as writing unit 250 (FIG. 5), the erasing modality is implemented by operating the set of addressable gates (262 in FIG. 5; 283 in FIG. 6A) in a non-selective mode in which substantially all or all of gates (e.g. 283 in FIG. 6A) are open to permit ions to be emitted therethrough, thereby mimicking ion emission from a corona, such as depicted in at least FIG. 6B.

After this action, as shown in FIG. 10B the passive e-paper display 131 is returned via conveying structures 310A, 310B toward a starting position as represented by directional arrow X2, and during which unit 514 is dormant. In other words, unit 514 is in a non-emission mode during travel of e-paper display 131 in the return/second travel direction.

As further represented by FIG. 10B, a second pass of e-paper display 131 is then initiated during which unit 514 emits second polarity ions 522 (e.g. negative in the example shown) to induce at least substantially the entire surface 125 to become populated with positively charged microparticles, such as white microparticles 120 in one example (e.g. FIG. 4). After this action, the passive e-paper display 131 is returned toward a starting position as represented by directional arrow X2 (FIG. 10C) while unit 514 is dormant. In other words, unit 514 is in a non-emission mode during travel of e-paper display 131 in the return/second travel direction.

In some examples, in a manner substantially similar to that described for the first pass, during the second pass the ions 522 are again emitted in the form of a blanket extending across an entire width of the e-paper display 131 such that ions 522 are received onto at least substantially the entire surface 125 of e-paper display 131. As previously noted regarding the first pass, in some examples, during the second pass the ion-emitting unit 514 emits ions 522 in a non-selective mode.

As represented by FIG. 10C, a third pass of e-paper display 131 is then initiated during which unit 514 emits first polarity ions 524 (e.g. positive in the example shown) in a selectable pattern to induce some portions of surface 125 to become populated with positively charged microparticles, such as black microparticles 124 in FIG. 4 (in one example), to form an image such as image 40 in FIG. 2A. In some examples, during this third pass the ion-emitting unit 514 operates in a selective mode, such as one example of writing unit 250 in FIGS. 5 (and 280 in FIG. 6A) in which electrode holes are selectively activated to permit passage of ions, and thereby emit a selectable pattern of ions onto the surface 125 of passive e-paper display 131.

As in previously described examples, the double erasing action implementable via unit 514 may minimize the chances of stray microparticles (e.g. microparticle 126 in FIGS. 3A-3B) remaining at surface 125 of e-paper display 131 prior to writing a new image via unit 514.

Because the arrangement in FIGS. 10A-10C includes just one ion-emitting element, in some examples a time period (T1) between successive applications (e.g. first pass, second pass, third pass) is not determined by a distance (e.g. D3, D4) between adjacent (but spaced apart) ion-emitting elements. Instead, the time period (T1) is at least partially determined according to a length of the e-paper display 131 and velocity of relative movement of e-paper display 131 relative to the ion-emitting unit 514. In addition, the time period (T1) is further determined according to at least some of substantially the same factors or subject to analogous factors used to determine distances D2 and D3 in association with at least FIGS. 4 and 7A.

Moreover, time period (T1) between the first and second passes may or may not be the same as the time period between the second and third passes.

FIG. 11A is a block diagram schematically representing a control portion 660, according to one example of the present disclosure. In some examples, control portion 660 includes a controller 662 and a memory 670. In some examples, control portion 660 provides one example implementation of control portion 35 in FIG. 1B.

Controller 662 of control portion 660 can comprise at least one processor 664 and associated memories that are in communication with memory 670 to generate control signals, and/or provide storage, to direct operation of at least some components of the systems, components, and modules described throughout the present disclosure. In some examples, these generated control signals include, but are not limited to, employing imaging manager 671 stored in memory 670 to manage imaging (including at least erasing) a passive e-paper display in the manner described in at least some examples of the present disclosure.

In response to or based upon commands received via a user interface (e.g. user interface 690 in FIG. 11B) and/or via machine readable instructions, controller 662 generates control signals to implement at least timing and sequence of the operation of erasing units, writing units, and relative movements therebetween in accordance with at least some examples of the present disclosure. In some examples, controller 662 is embodied in a general purpose computer while in other examples, controller 662 is embodied in the imaging devices described herein generally or incorporated into or associated with at least some of the components described throughout the present disclosure, such as control portion 35 (FIG. 1B).

For purposes of this application, in reference to the controller 662, the term "processor" shall mean a presently developed or future developed processor (or processing resources) that executes sequences of machine readable instructions contained in a memory. In some examples, execution of the sequences of machine readable instructions, such as those provided via memory 670 of control portion 660 cause the processor to perform actions, such as operating controller 662 to implement at least erasing and/or other imaging-related functions (including writing), as generally described in (or consistent with) at least some examples of the present disclosure. The machine readable instructions may be loaded in a random access memory (RAM) for execution by the processor from their stored location in a read only memory (ROM), a mass storage device, or some other persistent storage, as represented by memory 670. In some examples, memory 670 comprises a volatile memory. In some examples, memory 670 comprises a non-volatile memory. In some examples, memory 670 comprises a computer readable tangible medium providing non-transitory storage of the machine readable instructions executable by a process of controller 662. In other examples, hard wired circuitry may be used in place of or in combination with machine readable instructions to implement the functions described. For example, controller 662 may be embodied as part of at least one application-specific integrated circuit (ASIC). In at least some examples, the controller 662 is not limited to any specific combination of hardware circuitry and machine readable instructions, nor limited to any particular source for the machine readable instructions executed by the controller 662.

In some examples, user interface 690 provides for the simultaneous display, activation, and/or operation of at least some of the various components, modules, functions, parameters, features, and attributes of control portion 660 and/or the various aspects of erasing and/or writing operations, as described throughout the present disclosure. In some examples, at least some portions or aspects of the user interface 690 are provided via a graphical user interface (GUI). In some examples, user interface 690 includes an input 692 and a display 691, which may or may not be combined in a single element, such as a touch screen display.

FIG. 12 is a flow diagram schematically representing a method 750 of manufacturing an imaging device for a passive e-paper display, according to one example of the present disclosure. In some examples, method 750 is performed via at least some of the devices, units, components, modules, elements, etc. as previously described in association with at least FIGS. 1-11B. In some examples, method 750 is performed via at least some devices, units, components, modules, elements, etc. other than previously described in association with at least FIGS. 1-11B.

As shown in FIG. 12, at 752 method 750 includes providing an erasing unit to emit ions in a first polarity followed by an opposite second polarity after a first time period. At 754, method 750 includes arranging a support for a passive e-paper display in a spaced apart relationship relative to the erasing unit and by which the emitted ions are receivable onto substantially the entire surface of the passive e-paper display. At 756, method 750 includes arranging for relative movement to occur between the support and the erasing unit at least some of the time during the emission of ions.

Via at least some examples of the present disclosure, image clarity on a passive e-paper display may be achieved via multiple erasure actions prior to writing a new image. Among other potential effects, multiple erasure actions may facilitate eliminating image memory from images previously written to the e-paper display.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A device comprising:
a first unit comprising an ion generating element to emit ions in a first polarity mode followed by an opposite second polarity mode after a first time period; and
a support onto which a passive e-paper display is mountable in a spaced apart relationship relative to the first unit suspended above the support and by which the emitted ions are receivable onto substantially the entire surface of the passive e-paper display,
wherein at least the emission of ions in the first and second polarity modes is to be performed without heating the passive e-paper display at least during the emission of ions in the first and second polarity modes; and
a writing unit located downstream from the first unit and spaced apart from the support to write, via an addressable gate array of the writing unit, a pattern of ions onto the passive e-paper display to form an image thereon, the writing unit to write the pattern of ions after a second time period following operation of the first unit in the second polarity mode,
wherein relative movement occurs between the support and the first unit at least some of the time during the emission of ions.

2. The device of claim 1, wherein the ion generating element of the first unit includes:
a first portion to emit ions in the first polarity; and
a second portion to emit ions in the opposite second polarity.

3. The device of claim 2, wherein the second portion is spaced apart from and downstream along a travel path from the first portion.

4. An imager comprising:
a support to releasably receive a passive e-paper display;
a first unit spaced apart from the support, and comprising a first ion generating element, to make a first contact-less emission of first polarity ions and a second contact-less emission of second polarity ions onto the passive e-paper display, wherein the second emission of the second polarity ions is performed a selectable first time period after the first emission, wherein at least the first and second emissions are to be performed without heating the passive e-paper display during at least the first and second emissions;
a second unit comprising a second ion generating element to make a third contact-less emission of first polarity ions, via an addressable gate array of the second unit, in a selective pattern onto the passive e-paper display to form an image, the third emission occurring a selectable second time period after the second emission with the second unit located downstream along a travel path from the first unit; and
wherein relative movement occurs between the support and at least one of the respective first and second units at least some of the time during the respective first, second, and third emissions.

5. The imager of claim 4, wherein the first ion generating element of the first unit comprises:
a first portion to make the first emission of first polarity ions; and
a second portion to make the second emission of second polarity ions, and wherein the second portion is located downstream along a travel path from the first portion, and the second unit is spaced apart from the second portion downstream along the travel path.

6. The imager of claim 4, wherein the first ion generating element of the first unit is to operate in a first polarity mode to make the first emission and in a second opposite polarity mode to make the second emission, and wherein a first instance of relative movement between the first unit and the support occurs during the first emission and a second instance of relative movement between the first unit and the support occurs during the second emission.

7. The imager of claim 4, wherein the first polarity is negative and the second polarity is positive, and wherein the passive e-paper display includes a layer of microcapsules, with each microcapsule including:
- a plurality of positively-charged black microparticles; and
- a plurality of negatively-charged white microparticles.

8. An imager comprising:
- a unit comprising an ion generating element to emit ions; and
- a framework to support a passive e-paper display in a releasably mountable position spaced apart from, and below the unit, to receive the emitted ions in an airborne manner, wherein the ion generating element of the unit operates convertibly between at least:
- an erasing mode to emit, onto the passive e-paper display, a first blanket of ions having a first polarity and a second blanket of ions having an opposite second polarity, wherein the second blanket is to be emitted a selectable first time period after the first blanket, and wherein at least the emission of the first and second blanket of ions are to be performed without heating the passive e-paper display at least during the emission of the first and second blanket of ions; and
- a writing mode to emit, onto the passive e-paper display, a selectable pattern of ions having the first polarity to cause formation of an image on the passive e-paper display, wherein the writing mode is implemented a selectable second time period after completion of the erasing mode, wherein relative movement occurs between the unit and the passive e-paper display at least some of the time during operation of the erasing mode and the writing mode.

9. The imager of claim 8, comprising:
- a controller to cause relative movement, via the framework, of the e-paper display in:
- first travel direction during emission of the respective first and second blanket of ions in the erasing mode and during the writing mode; and
- an opposite second direction during a non-emission mode occurring between the first and second emission of ions in the erasing mode and during a non-emission mode occurring between the second emissions of ions in the erasing mode and the writing mode.

10. The imager of claim 8, wherein the first polarity is negative and the second polarity is positive, and wherein the passive e-paper display includes a layer of microcapsules, with each microcapsule including:
- a plurality of positively-charged black microparticles; and
- a plurality of negatively-charged white microparticles.

11. The imager of claim 10, wherein the unit includes a plurality of addressable gates through which the ions from the ion generating element are emitted, and in the erasing mode, at least substantially all of the gates are open to permit emission of the respective first and second blanket of ions, and in the writing mode, selectable gates are open to permit emission of the selectable pattern of ions.

* * * * *